United States Patent [19]

Balkman

[11] Patent Number: 5,093,622
[45] Date of Patent: Mar. 3, 1992

[54] METHOD AND APPARATUS FOR DETERMINING DIRECTION TO AND POSITION OF AN UNDERGROUND CONDUCTOR

[75] Inventor: William D. Balkman, Austin, Tex.

[73] Assignee: Minnesota Mining and Manufacturing Company, St. Paul, Minn.

[21] Appl. No.: 325,153

[22] Filed: Mar. 17, 1989

[51] Int. Cl.$^5$ ............................................. G01V 3/11
[52] U.S. Cl. ........................................ 324/326; 324/67
[58] Field of Search ............. 324/67, 326, 327, 328, 324/329, 243, 260-262, 226, 228, 234

[56] References Cited

U.S. PATENT DOCUMENTS

| | | | |
|---|---|---|---|
| 4,134,061 | 1/1979 | Gudgel | 324/326 |
| 4,220,913 | 9/1980 | Howell et al. | 324/326 |
| 4,295,095 | 10/1981 | Thomas et al. | 324/326 |
| 4,387,340 | 6/1983 | Peterman | 324/326 |
| 4,390,836 | 6/1983 | Bruce et al. | 324/326 |
| 4,427,942 | 1/1984 | Sole | 324/326 |
| 4,438,389 | 3/1984 | De Sa | 324/326 |
| 4,520,317 | 5/1985 | Peterman | 324/326 |
| 4,542,344 | 9/1985 | Darilek et al. | 324/326 |
| 4,639,674 | 1/1987 | Rippingale | 324/326 |
| 4,665,369 | 5/1987 | Faller et al. | 324/326 |
| 4,843,324 | 6/1989 | Humphreys, Jr. et al. | 324/326 |

FOREIGN PATENT DOCUMENTS 2136131  9/1984  United Kingdom ............... 324/326

OTHER PUBLICATIONS

Bitter et al., *McGraw-Hill Mathematics*, McGraw-Hill Inc. Publications, copyright 1981, pp. 270-271.

Primary Examiner—Kenneth A. Wieder
Assistant Examiner—W. Edmonds
Attorney, Agent, or Firm—Gary L. Griswold; Walter N. Kirn; Jack V. Musgrove

[57] ABSTRACT

An apparatus for determining the direction to and position of a buried conductor carrying an AC signal. The apparatus employs a unique antenna unit having upper and lower sensors, each sensor having two orthogonal solenoid coils. The signals from these coils, which are representative of the magnetic flux therethrough, are processed to yield corresponding digital values. The numbers are combined in a novel formula to yield a value which has been empirically found to be indicative of lateral postion. An appropriate display is controlled by the microprocessor according to the sign and magnitude of the positional value.

20 Claims, 4 Drawing Sheets

METHOD AND APPARATUS FOR DETERMINING DIRECTION TO AND POSITION OF AN UNDERGROUND CONDUCTOR

BACKGROUND OF THE INVENTION

1. Field of the Invention

The present invention generally relates to location of obscured conduits, and more particularly to a method of, and apparatus for, determining the direction to and position of an underground cable or pipeline which is capable of carrying an alternating electrical current.

2. Description of the Prior Art

Buried conduits are employed for supplying a wide variety of utilities, including pipelines for gas, water and sewage, and cables for telephone, power and television. It often becomes necessary to locate defective or damaged cables, pipes, etc., in order to repair or replace them. Conversely, it is important to know the approximate vicinity of such items in order to avoid disturbing them when digging or excavating for other purposes.

A convenient method for locating underground telephone or electrical cables exists in the prior art. Typically, the cable comes to the surface at various spaced locations in terminal boxes known as pedestals. An amplified signal source may be directly connected or inductively coupled to a given wire or wire pair at the pedestal. The wire acts as an antenna, re-radiating the signal along the full length of the cable. A receiver unit may then be used to trace the path of the cable above ground. While this technique is highly suited to electrically conductive (current carrying) wires, it may also be used on conductive pipes. Moreover, nonconductive conduits may be installed with a parallel wire marker which can be used to trace the path of the conduit.

The present invention relates to the receiver unit used to detect the electromagnetic radiation emitted by the conduit or marker. Several instruments have been devised which perform this general function. For example, U.S. Pat. No. 4,387,340 issued to E. Peterman discloses a receiver having four sensors mounted in a fixed relationship. Two of the sensors (electrical pick-ups or antenna coils) are used for left-right determination of the position of the buried conductor. In operation, the axes of both coils are horizontally disposed and the coils are horizontally spaced. The outputs are subtractively combined to produce a signal which is related to the difference between the magnetic flux in each coil. Thus, when the device is centered over the conductor, the field strengths through the coils cancel each other out, which is reflected in an appropriate display device. When the difference is non-zero, the phase of one horizontal coil is compared to the phase of the other to determine leftright position. The identical invention is also disclosed in a divisional application, now U.S. Pat. No. 4,520,317.

A device operating on a slightly different principle is described in U.S. Pat. No. 4,427,942 issued to L. Sole. That device employs two coils whose axes are horizontally disposed, the coils being separated vertically. The coil signals are rectified and the average DC voltages compared. When the apparatus is directly over the conductor, the two signals are essentially equal (non-zero), and an indicator alerts the user to this fact. This device does not, however, provide left-right guidance.

Another invention operates on a phasecomparison principle similar to Peterman. U.S. Pat. No. 4,639,674 depicts an apparatus having three coils, all vertically disposed, lying in a triangular formation, the plane formed thereby being vertical also. A flip-flop serves as a phase detector between the two signals from the lower coils. The third coil acts to eliminate the effect of ambient magnetic fields.

Three other patents of interest employ phase comparison to locate the conductor. U.S. Pat. Nos. 4,134,061 issued to H. Gudgel; 4,438,389 issued to A. DeSa; and 4,390,836 issued to Bruce et al. each include additional coils for locating faults ("holidays") in the conductor in addition to tracing the conductor path. The '836 patent is of particular interest inasmuch as it employs two orthogonally disposed coils for tracing the conductor path.

The use of orthogonally disposed coils is also illustrated in U.S. Pat. No. 4,220,913 issued to Howell et al. Four coils are shown in a rectangular arrangement; however, only the two vertically disposed coils are initially used to determine whether the unit is directly above the buried conductor. Left-right determination is then made by comparing the phase of the signal from one of the vertical coils to the phase of the signal from one of the horizontal coils. In other words, it is not necessary to use all four coils for left-right determination (the "extra" coil is used for depth determination).

Another orthogonal configuration of coils is disclosed in U.S. Pat. No. 4,542,344 issued to Darilek et al., which is probably the closest prior art. As shown in FIG. 1A, that invention includes two sensors 10 and 12 horizontally separated a distance R, which are held a fixed distance from the ground by a rod 14. Each sensor comprises two coils, one vertically disposed and one horizontally disposed, resulting in four leads A, B, C and D. As further illustrated in FIG. 1B, inputs from these leads are directed to a multiplexer 16 which combines the signals into a single output to an automatic gain control (AGC) 18. AGC 18 averages the amplitude of each signal against the prior four signal amplitudes, which is passed to demultiplexer 20 to yield weighted voltage values ($V_A$, $V_B$, $V_C$ and $V_D$) for each coil. These values are then used to compute the leftright offset L according to the equation:

$$L = \frac{(V_B)(V_D)R}{(V_A)(V_C) + (V_B)(V_D)}$$

This computation is made in microprocessor 22, and passed to display 24.

The primary disadvantage of the foregoing devices is their limited accuracy. Several of the devices provide left-right indication by means of an audible signal, requiring that the technician be familiar with the characteristic tones of the unit. This subjective factor introduces human error into the system, which is exacerbated by interference from ambient electromagnetic fields. Accuracy is further impeded by variations in the received signal amplitudes and additional conductors buried in the vicinity. For example, all of the foregoing devices have difficulty in resolving two adjacent, parallel cables carrying the same AC signal. This effect is especially pronounced when current flow in one cable is opposite that in the second cable. It would, therefore, be desirable and advantageous to devise an apparatus which sharply discerns lateral crossover as the unit traverses a buried conductor carrying an alternating current.

Accordingly, the primary object of the present invention is to provide a method and apparatus for locating buried conductors.

Another object of the invention is to provide such an apparatus which detects electromagnetic radiation emitted from the buried conductor in such a manner as to clearly distinguish the point of lateral crossover.

Still another object of the invention is to provide a locating apparatus which gives an indication of proximity of the conductor as well as indicating whether the conductor lies to the left or to the right of the user.

Yet another object of the invention is to provide such an apparatus which is portable and easy to use in field applications.

SUMMARY OF THE INVENTION

The foregoing objects are achieved in a receiver having a novel antenna configuration. Two sensors are vertically separated, each sensor having two orthogonal antenna coils. Signals from each coil are processed in a unique manner to yield a positional value of the buried conductor. The function thus obtained exhibits a distinctive pattern clearly identifying the lateral position of the conductor. In addition to left-right determination, the invention also provides a measure of proximity to the buried conductor.

BRIEF DESCRIPTION OF THE DRAWINGS

The novel features of the invention are set forth in the appended claims. The invention itself, however, will best be understood by reference to the accompanying drawings, wherein:

DESCRIPTION OF THE PREFERRED EMBODIMENT

Figure 1A:
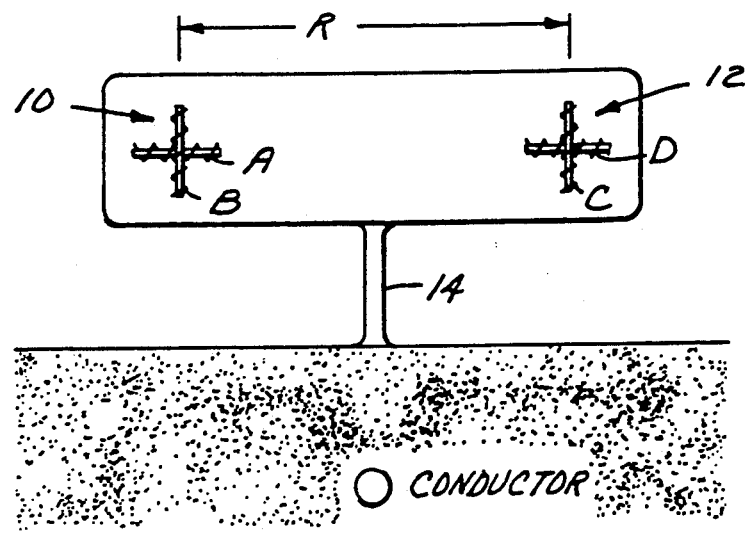
FIG. 1A illustrates the antenna configuration of a prior art device (the '344 patent) and its spatial orientation with respect to a buried conductor.
Figure 1B:
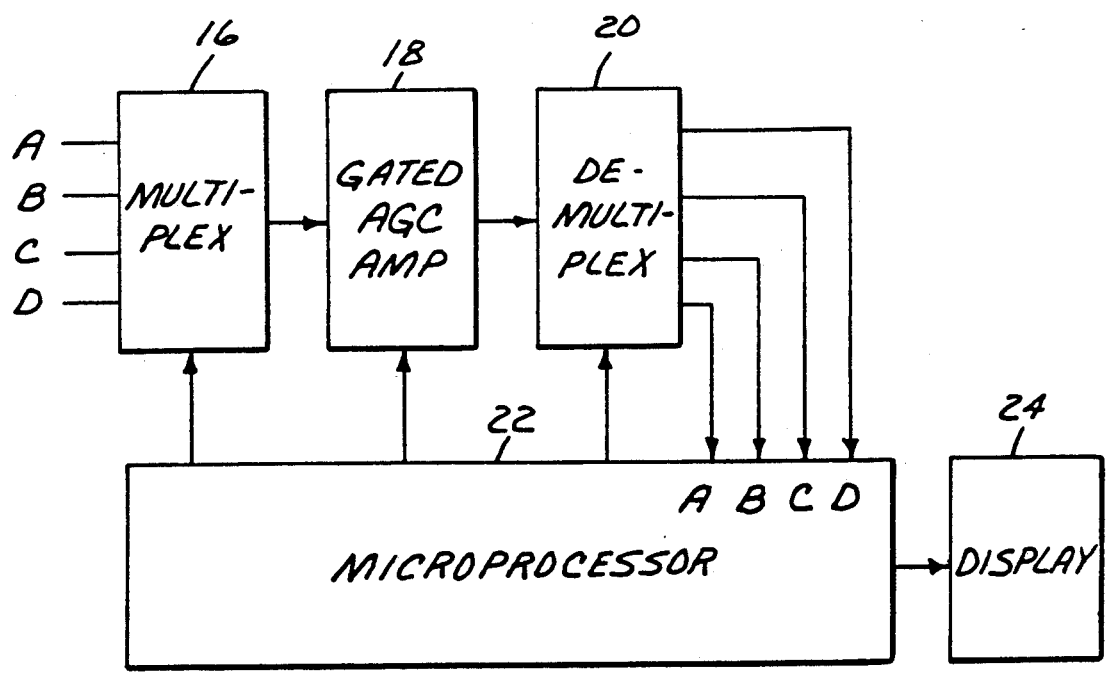
FIG. 1B is a block diagram showing the processing circuits of the prior art device of FIG. 1A.
Figure 2A:
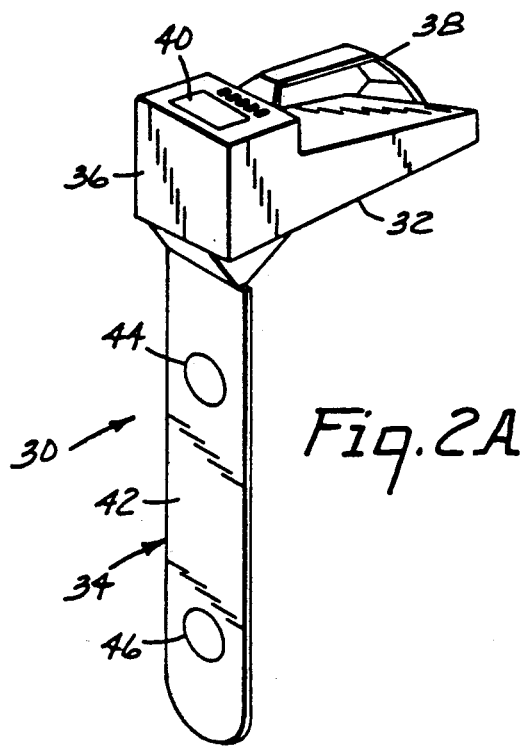
FIGS. 2A and 2B are perspective and front elevational views, respectively, of the locating apparatus of the present, invention.
Figure 2B:
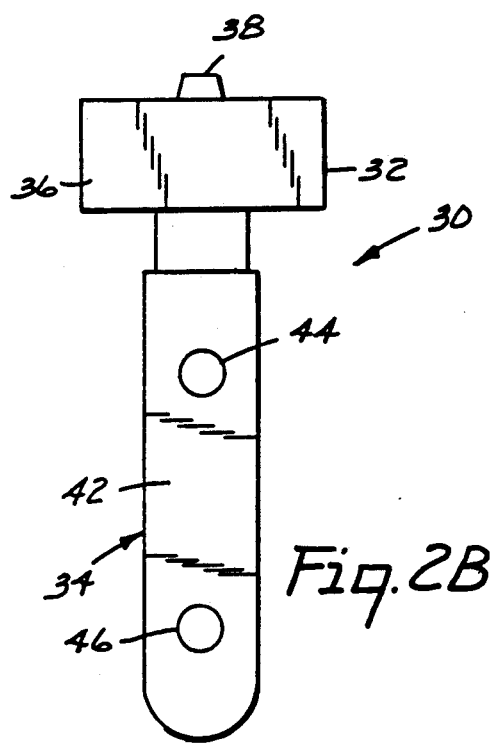

With reference now to the drawings, and in particular with reference to FIGS. 2A and 2B, there is depicted a locating apparatus 30 of the present invention. Before discussing the specific components of locating apparatus 30, it should be noted that a great deal of knowledge already exists in this technical field, some of which may be applied to the embodiments discussed herein. Therefore, practitioners of the present invention are advised to review the patents discussed above in the Description of the Prior Art, and each of those patents is hereby incorporated by reference.

Locating apparatus 30 is generally comprised of receiver unit 32 and antenna unit 34. Receiver unit 32 includes a housing 36 which accommodates the various electrical components described below in conjunction with FIG. 3. Housing 36 may be constructed of any durable material, preferably a hard polymeric substance, and should be constructed so as to be water resistant. A suitable material may be obtained from General Electric Co., sold under the trademark XENOY, which is a polycarbonite/polyester blend. A handle 38 is conveniently attached to housing 36, and a display 40 mounted thereon for providing visual indication of proximity and direction of the conductor being located. The size of housing 36 depends on several factors, such as the dimensions of display 40, and the size of the internal components, especially the portable power supply (battery). In the preferred embodiment, housing 36 is approximately 25 cm × 15 cm × 15 cm (10"×6"×6").

Antenna unit 34 is attached to and depends from receiver unit 32. Antenna unit 34 consists of a flat, elongated sheath 42 which accommodates two sensors (discussed more fully below). Sheath 42 is constructed of the same durable material as housing 36 and may be formed integrally with housing 36, although a detachable antenna is favored. It is important that the material of sheath 42 be essentially nonconductive and nonmagnetic as the electromagnetic radiation from the buried conductor must penetrate sheath 42 in order to be detected by the sensors. The dimensions of sheath 42 primarily depend on the distance between the sensors which, in the preferred embodiment, result in approximate sheath dimensions of 69 cm × 13 cm × 5 cm (27"×5"×2").

Figure 3:
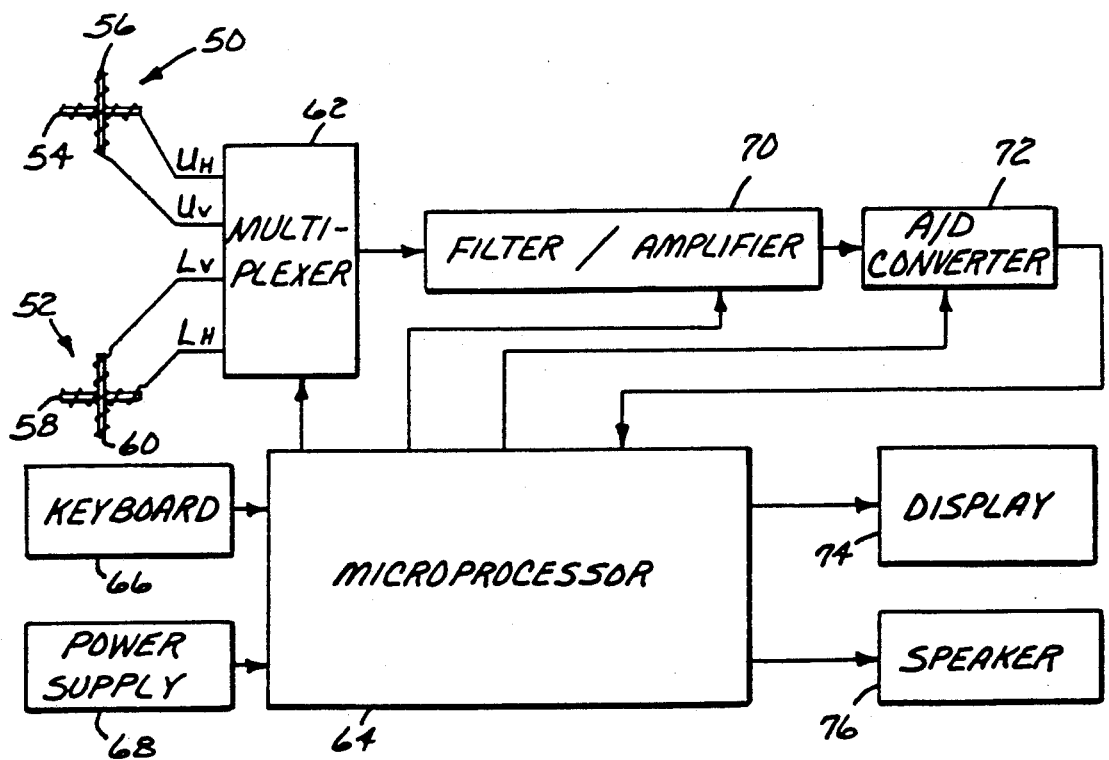
FIG. 3 is a block diagram of the electrical circuitry of the present invention.

Sheath 42 has two bubbles or convex surfaces 44 and 46 which create internal cavities for receiving the sensors. The sensors 50 and 52 (magnetic flux detectors) are depicted in FIG. 3 which also shows, in block form, the various electrical components of receiver unit 32. Sensors 50 and 52 are optimally spaced about 46 cm (eighteen inches) apart. Each sensor 50 and 52 is comprised of two orthogonally disposed coils, which is necessary to provide a complete reading of the transverse magnetic flux proximate a given sensor. The coils need not be in the cross shape illustrated, but they should be essentially perpendicular to one another. This results in a total of four coils, upper horizontal coil 54 (the "first coil" in the claims), upper vertical coil 56 (the "second coil" in the claims), lower horizontal coil 58 (the "third coil" in the claims), and lower vertical coil 60 (the "fourth coil" in the claims). Sensors 50 and 52 are aligned, i.e., vertical coils 56 and 60 have a common axis. Horizontal coils 54 and 58 have parallel axes.

The use of the terms "horizontal" and "vertical" is accurate when describing use of locating apparatus 30 to locate conductors which are below the apparatus, but they are not meant to be construed in a limiting sense. For example, if the conductor to be located were buried adjacent to an inclined retaining wall, the pitch angle of antenna unit 34 would be adjusted normal to the surface of the wall. In other words, the term "vertical" implies a direction normal to the surface which obscures the conductor, and the term "horizontal" implies a direction parallel to this surface.

Each of the coils in sensors 50 and 52 is a solenoid-type winding about a ferrite core. They may, of course, be replaced by other kinds of magnetic flux detectors. The leads from each coil 54, 56, 58 and 60 are connected to a multiplexer 62, the signals therefrom being designated as $U_H$ (upper horizontal coil), $U_V$ (upper vertical coil), $L_H$ (lower horizontal coil), and $L_V$ (lower vertical coil). The voltage amplitude of these signals is proportional to the instantaneous value of the magnetic flux passing through the coils, and is normally in the milli- or microvolt range. The preferred embodiment utilizes a dual 4-channel analog multiplexer commonly sold under part number 74HC4052 by vendors such as Motorola (Austin, Tex.) and National Semiconductor (Santa Clara, Calif.).

Multiplexer 62 is controlled by microprocessor 64 which sequentially selects each antenna channel for processing. The preferred embodiment employs a microprocessor sold by Motorola under part number MC68HC11. The sampling frequency should be slightly greater than the frequency of the AC signal emitted by the conductor, e.g., if a 100 kHz signal is coupled to the conductor, sampling frequency is optimally in the range of 200 kHz to 500 kHz. A power supply 68 (a portable battery and regulator) is also provided to microprocessor 64.

The selected signal is directed from multiplexer 62 to a filter/amplifier 70 which, in the simplest embodiment, consists of a bandpass filter and an automatic gain controlled amplifier. The bandpass filter blocks frequencies outside of the desired range (the conductor AC signal). Amplification is based on the highest of the four last signals (i.e., one signal from each coil), and the amplified signal is optimally about 3 volts nominal peak-to-peak.

In the preferred embodiment, however, filter/amplifier 70 is a dual conversion receiver capable of functioning at different frequencies. This is favored since the AC signal in the buried conductor may be one of several different frequencies. Dual conversion receivers are known in the art and basically consist of an input mixer, an intermediate frequency amplifier, and an output mixer. The input mixer receives both the signal from the multiplexer and a signal from a local oscillator, or frequency synthesizer. The input mixer raises the multiplexed signal to the intermediate frequency which is preferably about one megahertz. This intermediate frequency signal is then subjected to automatic gain control as described above. The amplified signal is reduced to a lower frequency, preferably about one kilohertz, by the output mixer, which has the benefit of reducing the required signal sampling rate. In this manner, locating apparatus 30 has multiple frequency capability via adjustment of the frequency synthesizer in the conversion receiver, and the output of filter/amplifier 70 is always at the same frequency regardless of the conductor's AC signal frequency. The frequency synthesizer is adjusted via keyboard 66 and microprocessor 64.

An analog-to-digital converter 72 transforms the analog signal into a digital value which is temporarily stored in microprocessor 62. There are several known techniques for converting the analog signals to digital values, but the preferred method is by quadrature peak calculation where the signal is divided into two signals, one 90° out of phase with the other. After A-D converter 72 samples both signals, microprocessor 62 performs the peak calculation. This technique is known in the art. Once four consecutive values have been stored (one from each coil), a lateral position function M(P) is calculated according to the equation:

$$M(P) = L_V U_H - L_H U_V.$$

Each of the coil signal values are signed according to their polarity, and the resulting value M(P) may be positive or negative. In this regard, it is understood that the polarity (orientation) of the coils is uniform, i.e., horizontal coils 54 and 58 are both wound in the same manner, and the signals are received from leads on the same side of the coils. It has been empirically found that the above function is highly indicative of the lateral position of the buried conductor. This is reflected in the graph of FIG. 4.

Figure 4:
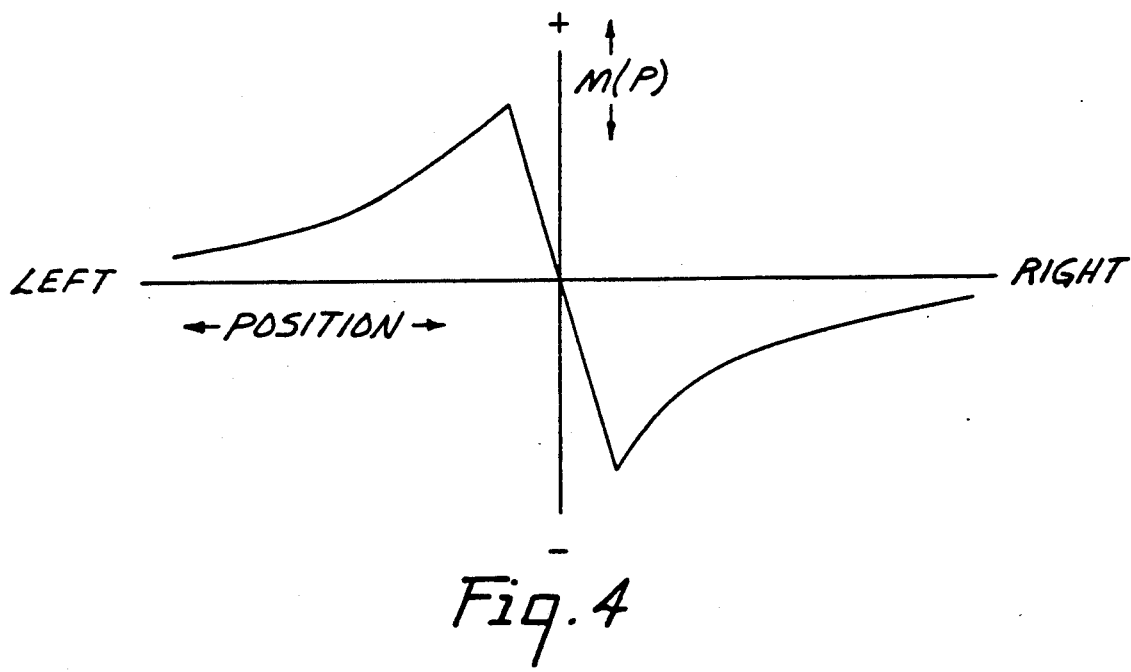
FIG. 4 is a graph showing the position function M(P) computed by the microprocessor in the locating apparatus.

As can be seen in FIG. 4, if M(P) is positive, then locating apparatus 30 is to the left of the conductor, but if M(P) is negative, locating apparatus 30 is to the right of the conductor. This information is transmitted to a display 74, discussed further below. It is also noteworthy that (i) in the proximity of the conductor, M(P) has a relatively sharp slope, and (ii) M(P) is zero when locating apparatus 30 is directly over the conductor. An optional speaker 76 may be used to further alert the technician when M(P) becomes extremely small.

Figure 5:
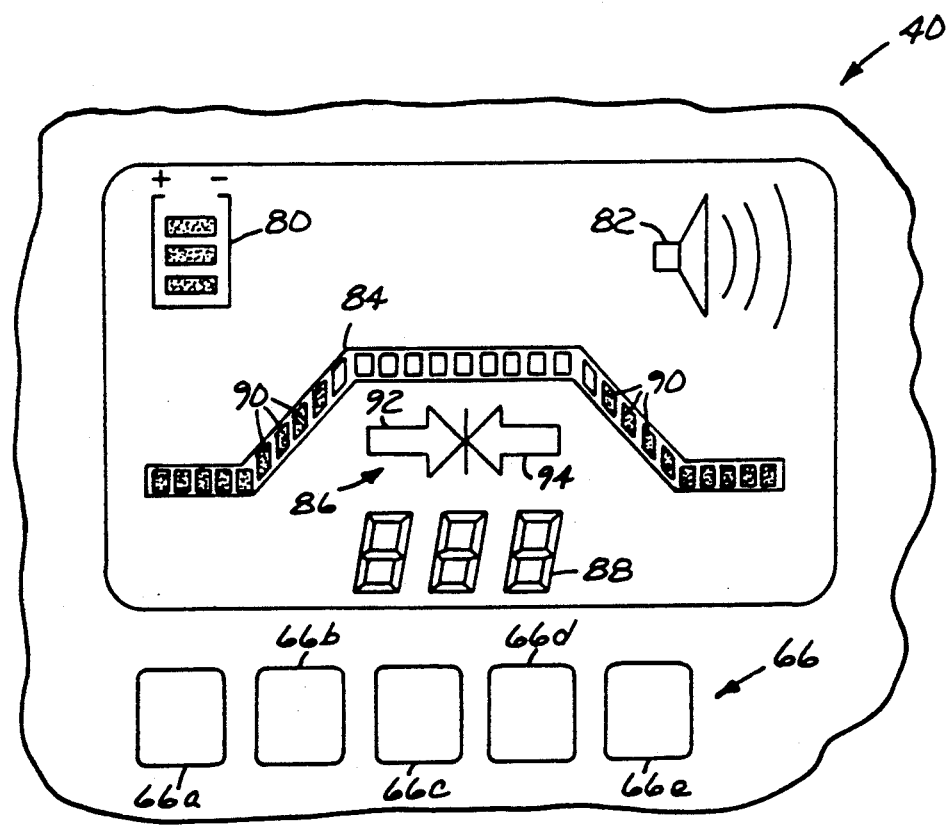
FIG. 5 is a plan view of the display of the illustrative embodiment of the present invention.

Referring now to FIG. 5, the display 40 of the illustrative embodiment is shown. Display 40 is preferably a liquid crystal display (LCD), but other types of displays, such as light emitting diodes, could be utilized. Display 40 includes five separate informational cues, battery indicator 80, speaker indicator 82, bar indicator 84, left-right indicator 86, and proximity indicator 88.

Battery indicator 80 merely indicates the relative voltage of the power supply inside receiver unit 32, while speaker indicator 82 confirms that the optional audible alarm has or has not been activated. Bar indicator 84 displays a series of rhombi or boxes 90 which are either gray or black (for an LCD) depending on the value of M(P). As the user moves toward the conductor, the boxes at the distal ends of bar indicator 84 turn from gray to black so that, when locating apparatus 30 is nearly over the conductor, nearly all of the boxes 90 have turned black.

Left-right indicator 86 preferably takes the form of two arrows 92 and 94 facing one another. One or the other of arrows 92 and 94 is highlighted (darkened for an LCD) according to the sign of M(P). When M(P) is nearly zero, both arrows may be darkened. Proximity indicator 88 is a digital readout which may display the magnitude of M(P). Actually, in practice, it has been found that analysis of the reciprocal of M(P) is more useful in determining the exact crossover point. Therefore, proximity indicator 88 would display this reciprocal, meaning that the crossover point would be indicated by an extremely large number in proximity indicator 88. The reciprocal value of M(P) is also actually used to drive bar indicator 84.

Keyboard 66 may be conveniently placed next to display 40, and consists of a plurality of keys 66a through 66e. The keys may be employed for directing microprocessor 64 as discussed above.

The configuration disclosed herein is easily modified to perform depth calculations as taught in U.S. Pat. No. 4,520,317 (col. 4, lines 22-38). Using the formula set forth in that patent, the depth D of the conductor is given by the equation:

$$D = K \frac{U_H}{L_H - U_H} - C$$

where $U_H$ and $L_H$ are as before, K is the distance between upper horizontal coil 54 and lower horizontal coil 58, and C is the distance from lower horizontal coil 58 to the bottom tip of antenna unit 34. This operation is performed by microprocessor 64, and may be initialized by one of the keys 66a–66e on keyboard 66. Other known methods of depth determination may also be utilized in locating apparatus 30.

Figure 6:
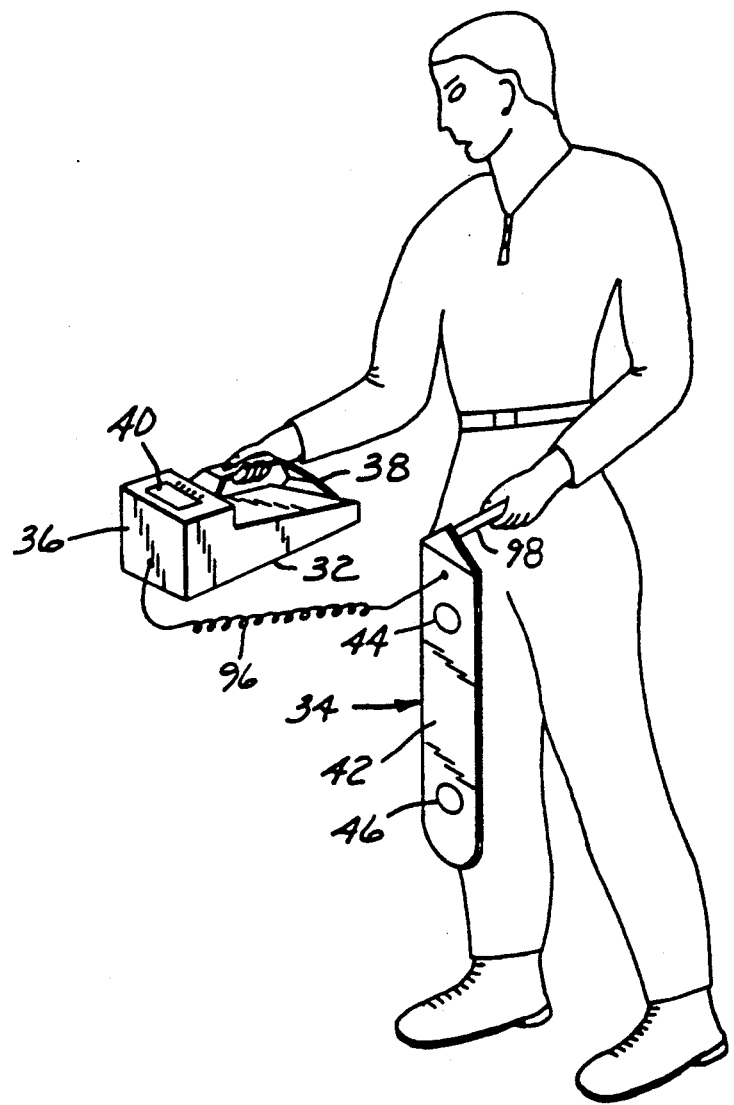
FIG. 6 is a perspective view depicting use of the receiver and antenna units of the present invention.

With further reference to FIG. 6, operation of locating apparatus 30 is explained. The first step in use of locating apparatus 30 is to connect an AC signal source to the underground conductor. Although this step is outside the scope of the present invention, methods for coupling the signal to the conductor are known. For more information on this point, the reader is directed to U.S. Pat. Nos. 4,119,908 issued to Cosman et al., and 4,322,677 issued to B. Wright, and Canadian Patent No. 993,516 issued to Cosman et al. (based on U.S. application Ser. No. 523,263 filed Nov. 13, 1974, now abandoned), each of which is hereby incorporated by reference.

After setting up the AC signal and reviewing documentation on the general location of the buried conductor, the technician should scan the area with antenna unit 34 while observing display 40 on receiver unit 32. In order to facilitate use of the device, antenna unit 34 may be detachable from receiver unit 34, and connected thereto by means of a cable 96. In this case, a grip 98 may be attached to the upper end of antenna unit 34.

One of the two arrows 92 or 94 will be darkened depending on the lateral position of locating apparatus 30 with respect to the conductor. First, the technician should rotate locating apparatus 30 to the point at which arrows 92 and 94 flip-flop (this aligns the apparatus perpendicular to the buried conductor). Then, the unit should be rotated ninety degrees, and the illuminated arrow followed. If, for example, arrow 92 (pointing to the right as observed by the technician) is highlighted, then the technician should move to the right. As he does so, bar indicator 84 will progressively darken more boxes 90 until all or nearly all of them become highlighted. At the same time, proximity indicator 88 will display increasingly larger numeric values. When the technician crosses over the conductor, left arrow indicator 94 will become highlighted and, as he moves further away, fewer boxes 90 in bar indicator 84 will darken, and the value displayed by proximity indicator 88 will decrease. In this manner, the technician may pinpoint the lateral location of the conductor, sometimes within inches.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, it has been found that the subject invention is more accurate than predecessor devices in resolving two parallel cables each carrying an AC signal. It is therefore contemplated that the appended claims will cover such modifications that fall within the true scope of the invention.

I claim:

1. An apparatus for determining the lateral direction to a current-carrying conductor, comprising:
   first sensor means for generating first and second analog signals associated with magnetic flux proximate said first sensor means;
   second sensor means in fixed spatial relationship to said first sensor means for generating third and fourth analog signals associated with magnetic flux proximate said second sensor means;
   processor means for computing the difference of (a) the product of said first and fourth signals, and (b) the product of said second and third signals, said difference being indicative of the lateral position of the conductor; and
   display means responsive to said difference for indicating lateral position of the conductor with respect to said first and second sensor means.

2. The apparatus of claim 1 wherein:
   said first sensor means comprises first and second coils which generate said first and second analog signals, respectively; and
   said second sensor means comprises third and fourth coils which generate said third and fourth analog signals, respectively.

3. The apparatus of claim 2 wherein:
   said first and second coils are generally perpendicular to one another;
   said third and fourth coils are generally perpendicular to one another; and
   said second and fourth coils essentially lie on a common axis.

4. The apparatus of claim 4 wherein said processor means includes:
   multiplexer means for sequentially sampling said first, second, third and fourth analog signals;
   filter/amplifier means connected to said multiplexer means for amplifying each of said analog signals;
   converter means connected to said filter/amplifier means for transforming each of said analog signals into digital values; and
   a microprocessor for receiving said digital values and computing said difference.

5. The apparatus of claim 4 wherein said filter/amplifier means comprises:
   a bandpass filter; and
   an automatic gain controlled amplifier.

6. The apparatus of claim 4 wherein said filter/amplifier means comprises dual conversion receiver means for outputting an amplified signal at a predetermined frequency regardless of the input frequency of said first, second, third and fourth analog signals.

7. The apparatus of claim 6 further comprising keyboard means for directing said microprocessor, said microprocessor regulating said dual conversion receiver means.

8. The apparatus of claim 7 further comprising audible signal means for indicating proximity of the conductor, said audible signal means being activated by said microprocessor when said difference is approximately zero.

9. The apparatus of claim 2 wherein the current-carrying conductor is buried, further comprising means for determining the depth of the buried conductor.

10. An apparatus for determining the lateral direction to a buried conductor carrying an AC signal, comprising:
   first and second orthogonally disposed coils for generating first and second analog signals representative of magnetic flux passing therethrough, said magnetic flux being associated with the AC signal;
   third and fourth orthogonally disposed coils for generating third and fourth analog signals representative of magnetic flux passing therethrough, said third and fourth coils being in a fixed spatial relationship with said first and second coils, and said second and fourth coils further essentially having a common axis;
   processor means for computing the difference of (a) the product of said first and fourth signals, and (b)

the product of said second and third signals, said difference being indicative of the lateral position of the buried conductor when said common axis is essentially vertical; and display means responsive to said processor means for indicating lateral position of the conductor based on the sign and magnitude of said difference.

11. The apparatus of claim 10 wherein said processor means comprises:
an analog multiplexer for sequentially sampling said first, second, third and fourth analog signals;
filter/amplifier means connected to said multiplexer for amplifying each of said analog signals;
an analog-to-digital converter connected to said filter/amplifier means for transforming each of said analog signals into digital values;
a microprocessor for receiving said digital values and computing said difference; and
power supply means for providing electricity to said microprocessor.

12. The apparatus of claim 11 wherein said filter/amplifier means comprises a dual conversion receiver for outputting an amplified signal at a predetermined frequency regardless of the input frequency of said first, second, third and fourth analog signals, and further comprising keyboard means for directing said microprocessor, said microprocessor regulating said dual conversion receiver and controlling the sampling time of said multiplexer.

13. The apparatus of claim 10 further comprising:
housing means for accommodating said processor means; and
sheath means for enclosing each of said coils, said sheath means being detachable from said housing means, and connected thereto by cable means.

14. The apparatus of claim 10 wherein said display means includes:
a left-right indicator responsive to said sign of said difference; and
a proximity indicator responsive to the reciprocal of said magnitude of said difference.

15. The apparatus of claim 10 further comprising audible signal means for indicating proximity of the conductor, said audible signal means being activated by said processor means when said difference is approximately zero.

16. The apparatus of claim 10 further comprising means for determining the depth of the buried conductor.

17. A locating apparatus for determining the lateral position of a conductor carrying an AC signal, the conductor being obscured by a surface, comprising:
first and second orthogonally disposed solenoid coils having ferrite cores for generating first and second analog signals whose amplitudes are proportional to the magnetic flux passing therethrough, said magnetic flux being associated with the AC signal;
third and fourth orthogonally disposed solenoid coils having ferrite cores for generating third and fourth analog signals whose amplitudes are proportional to the magnetic flux passing therethrough, said third and fourth coils being in a fixed spatial relationship with said first and second coils, and said second and fourth coils further essentially having a common axis;
an analog multiplexer connected to each of said solenoid coils for sequentially sampling said first, second, third and fourth analog signals;
a dual conversion receiver connected to said analog multiplexer for outputting amplified signals at a predetermined frequency regardless of the input frequency of said first, second, third and fourth analog signals;
an analog-to-digital converter connected to said dual conversion receiver for transforming said first, second, third and fourth analog signals into first, second, third and fourth digital values, corresponding to said amplitudes of said analog signals, respectively;
a microprocessor for receiving said digital values and computing the difference of (a) the product of said first and fourth digital values, and (b) the product of said second and third digital values, said difference being indicative of the lateral position of the conductor with respect to the obscuring surface when said common axis is essentially normal to the obscuring surface;
power supply means for providing electricity to said microprocessor;
keyboard means for directing said microprocessor, said microprocessor further regulating said dual conversion receiver and controlling the sampling time of said multiplexer;
display means responsive to said microprocessor for indicating lateral position of the conductor based on the sign and magnitude of said difference, said display means including:
a left-right indicator responsive to said sign of said difference; and
a proximity indicator responsive to the reciprocal of said magnitude of said difference;
a speaker connected to said microprocessor for indicating proximity of the conductor, said speaker being activated by said microprocessor when said difference is approximately zero;
a housing for accommodating said multiplexer, dual conversion receiver, analog-to-digital converter, microprocessor, power supply means, keyboard means, display means, and speaker; and
sheath means for enclosing each of said coils, said sheath means being detachable from said housing means, and connected thereto by cable means.

18. A method of determining the direction to and position of a buried conductor carrying an AC signal, comprising the steps of:
(a) positioning an antenna unit above the ground in the vicinity of the conductor, said antenna unit comprising:
first and second orthogonally disposed coils for generating first and second analog signals representative of magnetic flux passing therethrough, said magnetic flux being associated with the AC signal; and
third and fourth orthogonally disposed coils for generating third and fourth analog signals representative of magnetic flux passing therethrough, said third and fourth coils being located below said first and second coils, and said second and fourth coils further having a common, essentially vertical, axis;
(b) computing the difference of (i) the product of said first and fourth signals, and (ii) the product of said second and third signals, the sign and magnitude of said difference being indicative of the lateral position of the buried conductor common axis is essentially vertical; and moving the antenna unit the lateral direction indicated by said sign of said difference, while repeating step (b), until said magnitude of said difference is approximately zero.

19. The method of claim 18 wherein said computing step is carried out by processor means, said computing step further comprising the sub-steps of:
   sequentially sampling said first, second, third and fourth analog signals to yield four consecutive analog signals;
   amplifying each of said consecutive analog signals;
   converting each of said consecutive analog signals into consecutive digital values;
   storing said consecutive digital values until four such values are stored, corresponding to said first, second, third and fourth analog signals; and
   calculating said difference based on said consecutive digital values.

20. The method of claim 18 further comprising the steps of:
   calculating the reciprocal value of said difference; and
   displaying said reciprocal value on display means, thereby providing a numeric indicator of lateral proximity to the conductor.

* * * * *